United States Patent
Bonner et al.

(10) Patent No.: US 7,090,565 B2
(45) Date of Patent: Aug. 15, 2006

(54) METHOD OF CENTERLESS GRINDING

(75) Inventors: Anne M. Bonner, Nashua, NH (US); Edward L. Lambert, Westboro, MA (US); Bruce E. Vigeant, Oxford, MA (US); Eric Bright, Fiskdale, MA (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 164 days.

(21) Appl. No.: 10/925,127

(22) Filed: Aug. 24, 2004

(65) Prior Publication Data

US 2005/0026553 A1   Feb. 3, 2005

(51) Int. Cl.
*B24B 1/00* (2006.01)
*B24B 5/18* (2006.01)
*B24B 5/04* (2006.01)

(52) U.S. Cl. ......................... 451/49; 451/541
(58) Field of Classification Search .................. 451/49, 451/41, 526–550, 28
See application file for complete search history.

(56) References Cited

U.S. PATENT DOCUMENTS

| | | | |
|---|---|---|---|
| 1,983,082 A | 12/1934 | Howe et al. |
| 2,194,472 A | 3/1940 | Jackson |
| 2,216,728 A | 10/1940 | Benner et al. |
| 3,048,482 A | 8/1962 | Hurst |
| 3,916,584 A | 11/1975 | Howard et al. |
| 3,955,324 A | 5/1976 | Lindstrom |
| 3,982,359 A | 9/1976 | Elbel et al. |
| 4,024,675 A | 5/1977 | Naidich et al. |
| 4,311,489 A | 1/1982 | Kressner |
| 4,393,021 A | 7/1983 | Eisenberg et al. |
| 4,486,200 A | 12/1984 | Heyer et al. |
| 4,541,842 A | 9/1985 | Rostoker |
| 4,575,384 A | 3/1986 | Licht et al. |
| 4,652,275 A | 3/1987 | Bloecher et al. |
| 4,671,017 A | 6/1987 | Ideue et al. |
| 4,799,939 A | 1/1989 | Bloecher et al. |
| 5,039,311 A | 8/1991 | Bloecher |
| 5,127,197 A | 7/1992 | Brukvoort et al. |
| 5,129,189 A | 7/1992 | Wetscher |
| 5,178,644 A | 1/1993 | Huzinec |
| 5,203,886 A | 4/1993 | Sheldon et al. |
| 5,273,558 A | 12/1993 | Nelson et al. |
| 5,489,204 A | 2/1996 | Conwell et al. |
| 5,500,273 A | 3/1996 | Holmes et al. |
| 5,651,729 A | 7/1997 | Benguerel |
| 5,738,695 A | 4/1998 | Harmer et al. |
| 5,738,696 A | 4/1998 | Wu |
| 5,738,697 A | 4/1998 | Wu et al. |
| 5,849,052 A | 12/1998 | Barber, Jr. |
| 5,863,308 A | 1/1999 | Qi et al. |

(Continued)

FOREIGN PATENT DOCUMENTS

GB    491659    9/1938

(Continued)

*Primary Examiner*—Hadi Shakeri
(74) *Attorney, Agent, or Firm*—Mary E. Porter

(57) ABSTRACT

Organic bonded abrasive tools, having controlled microstructures, comprise a relatively low volume percentage of abrasive grain and a relatively low hardness grade, but are characterized by the excellent mechanical strength and efficient grinding performance of much harder grade, lower porosity tools, especially in versatile grinding processes, such as centerless grinding. A method for centerless grinding with these tools is provided. Methods for making the abrasive tools utilizing agglomerated abrasive grain are described.

18 Claims, 1 Drawing Sheet

U.S. PATENT DOCUMENTS

| | | |
|---|---|---|
| 5,975,988 A | 11/1999 | Christianson |
| 6,086,467 A | 7/2000 | Imai et al. |
| 6,093,092 A * | 7/2000 | Ramanath et al. .......... 451/541 |
| 6,136,288 A | 10/2000 | Bauer et al. |
| 6,217,413 B1 | 4/2001 | Christianson |
| 6,319,108 B1 | 11/2001 | Adefris et al. |
| 6,354,929 B1 | 3/2002 | Adefris et al. |
| 6,620,214 B1 | 9/2003 | McArdle et al. |
| 6,679,758 B1 | 1/2004 | Bright et al. |
| 6,988,937 B1 * | 1/2006 | Bonner et al. ................ 451/49 |

FOREIGN PATENT DOCUMENTS

| | | |
|---|---|---|
| GB | 1228319 | 4/1971 |
| GB | 1418730 | 12/1975 |
| WO | 96/10471 | 4/1996 |
| WO | 98/03306 | 1/1998 |
| WO | 00/51788 | 9/2000 |
| WO | 01/04227 | 1/2001 |
| WO | 01/83166 A1 | 11/2001 |
| WO | 01/85393 A1 | 11/2001 |
| WO | 02/28802 A2 | 4/2002 |

* cited by examiner

METHOD OF CENTERLESS GRINDING

BACKGROUND OF THE INVENTION

The invention relates to a method of centerless grinding and to abrasives tools used in centerless grinding and other cylindrical surface grinding processes designed to permit the option of small or large volume stock removal in the production of many categories of diverse parts.

Centerless grinding is a process for rapid, accurate, surface grinding of difficult to hold parts. The part to be ground, i.e., the workpiece, is rigidly supported directly under the cut without application of end pressure to the part, allowing heavier or deeper cuts to be made and making it possible to grind long, brittle or easily distorted parts. Among the parts manufactured by centerless grinding are straight and tapered bearings, rollers, bars, needle rollers, bushings, bolts, fasteners, pistons, piston rings, gun barrels, rods, shafts, shells, tappets, pen parts, hypodermic needles, forgings and numerous other items made of various metal, plastic, ceramics and composite materials.

Centerless grinding differs from other types of grinding in that the workpiece is not suspended between centers or by other fixtures connected to an end or a surface of the workpiece. Instead, the workpiece rests on a blade or support, and a regulating wheel, most often made of a rubber material, contacts the workpiece urging it against the support and against a grinding wheel. In most common systems, the grinding wheel rotation also rotates the workpiece, the cutting pressure developed by the grinding wheel forces the workpiece against the regulating wheel and the support, and the regulating wheel governs the speed of rotation of the workpiece. Thus, the grinding wheel and the workpiece can be rotated at different revolutions per minute (rpms). For example, a grinding wheel speed of 7,500 surface feet per minute (sfpm) may be used with a regulating wheel speed (and matching workpiece speed) of 36 to 900 spfm. Continuous or semi-automated grinding processes are possible with centerless grinding as parts can be continuously fed into the system, so long as the grinding wheel remains within specifications.

Thus, there exists a continual demand in grinding operations for improved grinding wheels for centerless grinding, wherein the wheels have consistent profiles throughout the body of the wheel as it grinds, the wheels are resistant to excessive wear and the wheels are effective in removing stock from workpieces leaving a smooth, uniform consistent part size, shape and finish.

In the past, grinding wheels for centerless grinding typically were improved by increasing their hardness grade by means of reducing the porosity of the wheel, increasing the abrasive grain and bond content and/or increasing the density of the abrasive composite making up the wheel. In general, these steps increased the grinding efficiency of any given process, i.e., the G-ratio (material removal rate/wheel wear rate or MRR/WWR), up to the point where the forces of grinding with these harder wheels began to interfere with part quality or exceeded the power capacity of the machine or, particularly in the case of organic bonded wheels, increased the wheel wear rate through excessive thermal degradation of the bond and premature release of unused abrasive grain from the abrasive composite.

It has now been discovered that certain abrasive tools having lower hardness grades exhibit improved grinding efficiency in centerless grinding processes and other grinding processes as a result of the material properties and microstructure of the abrasive composite, in particular, the means by which the abrasive grain is anchored within the composite. These abrasive tools perform in a significantly more efficient manner than the best prior art abrasive tools, especially when considered on the basis of volume of abrasive grain required to remove equivalent amounts of stock from a workpiece. The tools have utility in foundry grinding and snagging, and in track, bar and needle grinding, where higher density abrasive tools have been used, as well as in centerless grinding.

SUMMARY OF THE INVENTION

The invention is a method for centerless grinding, comprising the steps:

(a) providing a bonded abrasive wheel, comprising a three-dimensional composite of
   (i) a first phase comprising 20–48 vol % abrasive grains bonded with 20 to 48 vol % organic bond material and less than 10 vol % porosity, wherein 50 to 100 vol % of the abrasive grains are in the form of a plurality of grains agglomerated together by sintering the grain with an inorganic binder material, and wherein the first phase is the continuous phase of the composite; and
   (ii) a second phase consisting of 16 to 34 vol % porosity; wherein the bonded abrasive tool is characterized by a hardness grade between J and S on the Norton Company grade scale and a minimum burst speed of 6000 sfpm (30.48 m/s);

(b) mounting the bonded abrasive wheel on a centerless grinding machine;

(c) rotating the wheel; and (d) bringing a grinding surface of the rotating wheel into contact with a workpiece being rotated by a regulating wheel and supported by a workrest fixture for a sufficient period of time to grind the workpiece;

whereby the wheel removes workpiece material at an effective material removal rate, the grinding surface of the wheel remains substantially free of grinding debris and, after grinding has been completed, the workpiece is substantially free of thermal damage.

The efficient grinding wheels useful in the method of the invention may be selected from bonded abrasive tools, comprising a three-dimensional composite of:

(a) a first phase comprising 20–48 vol % abrasive grains bonded with 20 to 48 vol % organic bond material and less than 10 vol % porosity, wherein 50 to 100 vol % of the abrasive grains are in the form of a plurality of grains agglomerated together by sintering the grain with an inorganic binder material, and wherein the first phase is the continuous phase of the composite; and (b) a second phase consisting of 16 to 34 vol % porosity;

wherein the bonded abrasive tool is characterized by a hardness grade between J and S on the Norton Company grade scale and a minimum burst speed of 6000 sfpm (30.48 m/s).

DETAILED DESCRIPTION OF THE INVENTION

Figure 1:
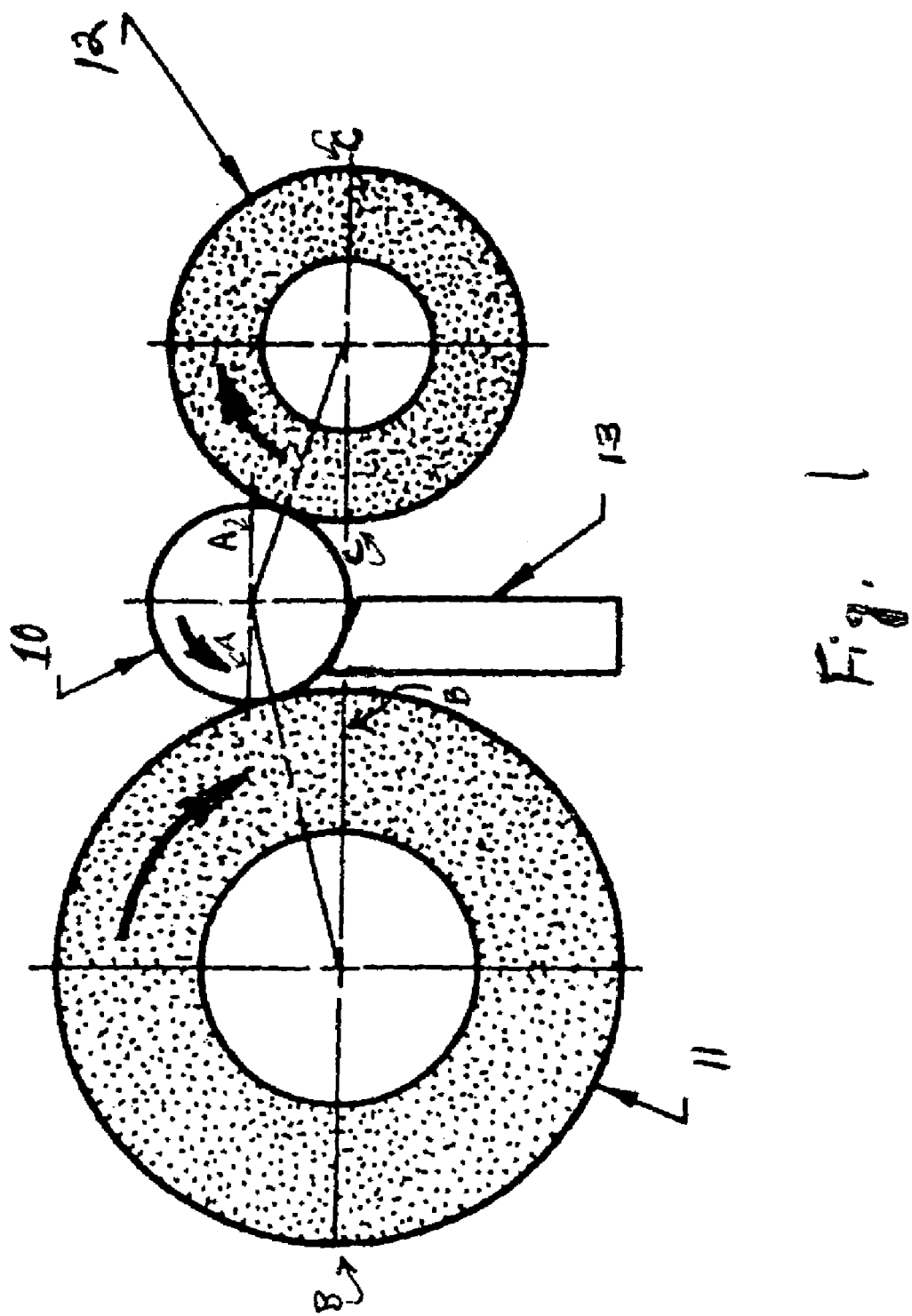
FIG. 1 is an illustration of a centerless grinding apparatus, showing a grinding wheel, a workpiece, a regulating wheel and a fixture in cross-sectional view.

The method of centerless grinding of the invention is a cylindrical grinding process for finishing the outside or the inside diameter of a workpiece that is carried out with selected grinding wheels having unusual wheel structures and physical properties. These wheels permit parts to be surface finished faster and much more efficiently than has been possible with methods of the prior art centerless grinding using conventional grinding wheels.

A typical centerless grinding system configuration is illustrated in FIG. 1. In the illustrated configuration, the centerline (A) of the workpiece or part (10) is set above the centerlines (B, C) of the grinding (11) and regulating (12) wheels. This permits production of round finished parts, such as bearings. The higher above center (B, C) the workpiece (10) is placed, the quicker the workpiece (10) is rounded. The support (13) may be flat or angled depending upon the desired finished shape of the part (10). If the centerlines (A, B, C) of the workpiece (10), grinding wheel (11) and regulating (12) wheel are in the same plane, the ground part will be of constant diameter, but not necessarily of cylindrical shape. Various three-arc triangular shapes are possible, depending upon whether the support (13) on which the workpiece rests is flat or angular. It is also possible to set the workpiece (10) below the centers (B, C) of the grinding (11) and regulating (12) wheels. In this case, long workpieces such as bars or rods may be ground without whipping or chattering and the workpiece (10) can be held very securely against the support (13).

The workpiece may be handled by through-feed grinding, by in-feed grinding, by end-feed grinding or by a combination of these techniques. Thus, tapered parts are made in end-feed grinding processes, parts with variable diameters having caps or shoulders are made in in-feed grinding processes and straight cylindrical parts, small or large, are made in through-feed grinding processes.

A type of bonded abrasive grinding wheel preferred for centerless grinding is a cylinder, having two circular faces, a mounting hole, and a radial perimeter and the grinding surface of the wheel is the radial perimeter of the cylinder. The bonded abrasive wheel has a minimum burst speed of 6000 sfpm (30.6 m/s) and preferably has a burst speed of 7500 sfpm (38.10 m/s).

In the method of the invention, a selected grinding wheel is mounted on an arbor of a centerless grinding machine and preferably rotated at about 5500 to 9600 sfpm (27.94 to 48.96 m/s), more preferably at 6000–9000 sfpm (30.6 to 45.9 m/s). When the selected grinding wheel is substituted for prior art wheels, the grinding operation is more efficient because the wheels have a longer life, more parts can be ground per wheel and fewer grinding machine changes are required to make the same volume of parts. The method may be carried out at any speed specified for the particular centerless grinding machine being operated, provided the speed does not exceed the safety limitations of the selected wheel (i.e., the wheel burst speed limits).

Suitable centerless machines may be obtained from Cincinnati Grinders, Inc., Cincinnati, Ohio, (e.g., No. 0, No. 2, No. 3, 4, Cinco 15, 230-10 Twin grip, 300 series, etc.), Koyo Machine Industries Co., Ltd., Japan, (Model KC-200, KC-33, KC-400), Lidkoping, Sweden, (Model 2C, 3B, 520, 630, 740, etc.), Litton Industrial Automation, Waynesboro, Pa., (Landis Tool Co.), (Landis No. 12, No. 12½, Landis 12R, 14R and 24CR), and many other machine fabricators.

The bonded abrasive wheels specified for carrying out the centerless grinding process of the invention are characterized by a previously unknown combination of wheel structure and physical properties. As used herein, the term "wheel structure" refers to the relative volume percentages of abrasive grain, bond (including fillers, if any are used) and porosity contained in the grinding wheel. Wheel hardness "grade" refers to the letter designation given to the wheel's behavior in a grinding operation. For a given bond type, grade is a function of the wheel porosity, grain content and certain physical properties, such as cured density, elastic modulus and sand blast penetration (the later is more typical of vitrified bonded wheels). The "grade" of the wheel predicts how resistant to wear the wheel will be during grinding and how hard the wheel will grind, i.e., how much power will be needed to use the wheel in a given grinding operation. The letter designation for wheel grade is assigned according to a Norton Company grade scale known in the art, wherein the softest grades are designated A and the hardest grades are designated Z (see, e.g., U.S. Pat. No. 1,983,082, Howe, et al). By matching wheel grades, one skilled in the art usually can substitute a new wheel specification for a known wheel and predict that the new wheel will perform in a manner similar to, or better than, the known wheel.

In a departure from known organic bonded wheel performance, the wheels specified for carrying out the centerless grinding method herein are characterized by a lower grade, i.e., are softer, than known wheels delivering comparable performance efficiency. Wheels having a Norton grade of about J to S on a phenolic resin bond scale are preferred, and M to R grades are most preferred. The wheels useful in the invention exhibit lower elastic modulus values than known wheels having equivalent porosity volumes, but, quite unexpectedly, they exhibit higher G-ratio values (ratio of material removal rate/wheel wear rate). These values are in excess of those achieved in the same grinding process utilizing comparative wheels made of the same materials, but having a hardness grade of T to Z.

The bonded abrasive tools may have a density of less than 2.4 g/cc, preferably have a density of less than 2.2 g/cc, and more preferably have a density of less than 2.0 g/cc.

The bonded abrasive tools useful in the invention are grinding wheels comprising about 20 to 48 volume %, preferably 24 to 44 volume %, and most preferably 26 to 38 volume % abrasive grain. A total of 50 to 100 volume % of the abrasive grain is in the form of a plurality of grains agglomerated together by sintering the grain with an inorganic binder material.

In a preferred embodiment, organic bonded abrasive tools comprise about 20 to 48 volume %, more preferably 28 to 38 volume %, and most preferably 26 to 38 volume % organic bond.

A first, continuous phase of these abrasive tools comprises a composite of the abrasive grain, bond and less than 10 volume % porosity. These tools also comprise a second phase consisting of about 16 to 34 volume % porosity, preferably 18 to 28 volume % porosity, and most preferably 18 to 24 volume % porosity. For any given wheel, the sum of the volume percentages of grain, bond and porosity for the combination of the first and second phases equals 100%.

The organic bonded abrasive tools preferably comprise 20 to 44 volume % sintered abrasive grain agglomerates, 20 to 48 volume % organic bond and 16 to 34 volume % porosity. Porous sintered abrasive grain agglomerates made with inorganic binding materials (e.g., vitrified or ceramic binding materials) are preferred because they permit the organic bond resin to be wicked into the interior of the porous agglomerate during thermal cure of the bonded abrasive tool, thus strengthening the anchor or bond post by which the abrasive grain is held within the abrasive composite. In spite of the porosity of these grain agglomerates and the minor amount (at least 1 vol %, preferably 2–12 vol %) of inorganic binder holding the abrasive grain in the agglomerates, the wheels retain high mechanical strength, resistance to wheel wear and aggressive grinding performance characteristics of a grinding wheel having a much harder grade designation.

The wheels useful in the invention have an elastic modulus of less than 20 GPa, preferably less than 18 GPa, and most preferably less than 16 GPa. Among other characteristics, a wheel manufactured with an effective amount (e.g., at least 50 volume % of the abrasive grain content, or at least 20 volume % of the total wheel volume after curing) of abrasives grain agglomerates will exhibit a lower elastic modulus than commercially used centerless grinding wheels made without abrasive grain agglomerates. The bonded abrasive tools of the invention have a sintered agglomerated grain microstructure, wherein the average diameter of the sintered agglomerates preferably ranges from about 200 to 850 microns (about 20 to 100 mesh, U.S. standard sieve size) for abrasive grit sizes of 46 to 100 (508 to 173 microns). In a preferred embodiment, the average diameter of the sintered agglomerates is approximately equal to an average dimension of the pores, the pore dimension being measured at a point of a maximum opening and the agglomerate being measured at a point of maximum diameter.

The porosity within the abrasive wheel arises from the open spacing provided by the natural packing density of the tool components, particularly the abrasive agglomerates, and, optionally, by adding conventional pore inducing media. Suitable pore inducing media includes, but is not limited to, hollow glass spheres, hollow spheres or beads of plastic material or organic compounds, foamed glass particles, bubble mullite and bubble alumina, and combinations thereof. The tools may be manufactured with open-cell porosity inducers, such as beads of naphthalene, or other organic granules, which may be removed after molding the tool to leave void spaces within the tool matrix, or they may be manufactured with closed cell, hollow pore inducing media (e.g., hollow glass spheres). Preferred abrasive tools of the invention either do not contain added pore inducer media, or contain a minor amount of added pore inducer media effective to yield an abrasive tool with a porosity content of 17 to 33% by volume.

The finished tools optionally contain added secondary abrasive grains, fillers, grinding aids and pore inducing media, and combinations of these materials. When an abrasive grain is used in combination with the abrasive agglomerates, the agglomerates provide 50 to 100% by volume, preferably provide from about 70 to about 100 volume % of the total abrasive grain of the tool. The tools optionally may contain a plurality of grains agglomerated together by curing with an organic binder material (e.g., phenolic resin or other organic bond materials used in making abrasive tools). When such secondary abrasive grains are used, these abrasive grains preferably provide from about 0.1 to about 50 volume % of the total abrasive grain of the tool, and more preferably, from about 0.1 to 30 volume % of the total abrasive grain of the tool. Suitable secondary non-agglomerated, abrasive grains include, but are not limited to, various aluminum oxides, sol gel alumina, sintered bauxite, silicon carbide, alumina-zirconia, aluminoxynitride, ceria, boron suboxide, cubic boron nitride, diamond, flint and garnet grains, and combinations thereof.

The abrasive tools of the present invention preferably are bonded with an organic bond. Any of the various thermosetting organic resin bonds known in the art of making abrasive tools may be selected for use herein. The organic bond material may be selected from the group consisting of phenolic resin materials, epoxy resin materials, polyimide resin materials, rubber materials, phenol formaldehyde resin materials, urea formaldehyde resin materials, melamine formaldehyde resin materials, acrylic resin materials and combinations thereof. Among these organic bonds used commercially in the manufacture of grinding wheels, phenolic bonds are preferred for strength, cost, availability, and manufacturing considerations.

Examples of suitable bonds and techniques for manufacturing such bonds may be found, for example, in U.S. Pat. Nos. 6,251,149 B1, 6,015,338, 5,976,204, 5,827,337 and 3,323,885, which are hereby incorporated by reference. The bonds and methods of manufacture described in commonly assigned U.S. patent application Ser. No. 10/060,982, to Simon, the contents of which are hereby incorporated by reference, and those of U.S. Pat. No. 3,323,885 are preferred for use herein. The organic bonded tools may be mixed, molded and cured or sintered according to various processing methods, and with various proportions of abrasive grain or agglomerate, bond and porosity components as are known in the art.

Abrasive wheel quality may be characterized by testing density, elastic modulus, mechanical strength, expressed as relative "burst speed" (the rotational speed at which centrifugal force causes the wheel to fly apart), and by wheel life, or resistance to wear during grinding.

The density and hardness of the abrasive tools are controlled by the selection of the agglomerates, type of bond and other tool components, the porosity contents, together with the size and type of mold and selected pressing process.

Abrasive wheels may be molded and pressed by any means known in the art, including hot, warm and cold pressing techniques. Care must be taken in selecting a molding pressure for forming the green wheels to avoid crushing an excessive amount of the abrasive grain agglomerates (e.g., more than 50%, by volume, of the agglomerates) and to preserve the three-dimensional structure of the agglomerates. The appropriate maximum applied pressure for making the wheels of the invention depends upon the shape, size, thickness and bond component of the abrasive wheel, and upon the molding temperature. The agglomerates of the invention have sufficient mechanical strength to withstand the molding and pressing steps carried out in typical commercial manufacturing processes for making abrasive tools.

The abrasive wheels may be cured by methods known to those skilled in the art. The curing conditions are primarily determined by the actual bond and abrasives used, and by the type of binding material contained in the abrasive grain agglomerate. Depending upon the chemical composition of the selected bond, an organic bond may be fired at 120 to 250° C., preferably 160 to 185° C., to provide the mechanical properties necessary for grinding metals or other materials.

Abrasive grain agglomerates useful herein are three-dimensional structures or granules, including sintered porous composites of abrasive grain and binding material. The agglomerates preferably have a loose packing density (LPD) of $\leq 2.0$ g/cc, more preferably $\leq 1.6$ g/cc, an average dimension of about 2 to 20 times the average abrasive grit size, and a porosity of about 30 to 88%, by volume. The abrasive grain agglomerates preferably have a minimum crush strength value of 0.2 MPa.

The abrasive grain may include one or more of the abrasive grains known for use in abrasive tools, such as the alumina grains, including fused alumina, sintered and sol gel sintered alumina, sintered bauxite, and the like, silicon carbide, alumina-zirconia, aluminoxynitride, ceria, boron suboxide, garnet, flint, diamond, including natural and synthetic diamond, cubic boron nitride (CBN), and combinations thereof. Any size or shape of abrasive grain may be used. For example, the grain may include elongated sintered sol gel alumina grains having a high aspect ratio of the type disclosed in U.S. Pat. No. 5,129,919.

Grain sizes suitable for use herein are in the regular abrasive grit size range (e.g., greater than 60 and up to 7,000 microns). For a given abrasive grinding operation, it may be desirable to agglomerate an abrasive grain with a grit size smaller than an abrasive grain (non-agglomerated) grit size normally selected for this abrasive grinding operation. For example, agglomerated 80 grit size abrasive may be substituted for 54 grit abrasive, agglomerated 100 grit for 60 grit abrasive and agglomerated 120 grit for 80 grit abrasive.

The preferred sintered agglomerate size for typical abrasive grains ranges from about 200 to 3,000, more preferably 350 to 2,000, most preferably 425 to 1,000 micrometers in average diameter.

The abrasive grain is present at about 10 to 65 volume %, more preferably 35 to 55 volume %, and most preferably 48 to 52 volume % of the total volume of the sintered agglomerate.

Binding materials useful in making the agglomerates preferably include ceramic and vitrified materials, preferably of the sort used as bond systems for vitrified bonded abrasive tools. These vitrified bond materials may be a pre-fired glass ground into a powder (a frit), or a mixture of various raw materials such as clay, feldspar, lime, borax, and soda, or a combination of fritted and raw materials. Such materials fuse and form a liquid glass phase at temperatures ranging from about 500 to 1400° C. and wet the surface of the abrasive grain to create bond posts upon cooling, thus holding the abrasive grain within a composite structure. Examples of suitable binding materials for use in the agglomerates are given in Table 1-1, below. Preferred binding materials are characterized by a viscosity of about 345 to 55,300 poise at 1180° C., and by a melting temperature of about 800 to 1,300° C.

In a preferred embodiment, the binding material is a vitrified bond composition comprising a fired oxide composition of 71 wt % $SiO_2$ and $B_2O_3$, 14 wt % $Al_2O_3$, less than 0.5 wt % alkaline earth oxides and 13 wt % alkali oxides.

The binding material also may be a ceramic material, including, but not limited to, silica, alkali, alkaline-earth, mixed alkali and alkaline-earth silicates, aluminum silicates, zirconium silicates, hydrated silicates, aluminates, oxides, nitrides, oxynitrides, carbides, oxycarbides and combinations and derivatives thereof. In general, ceramic materials differ from glassy or vitrified materials in that the ceramic materials comprise crystalline structures. Some glassy phases may be present in combination with the crystalline structures, particularly in ceramic materials in an unrefined state. Ceramic materials in a raw state, such as clays, cements and minerals, may be used herein. Examples of specific ceramic materials suitable for use herein include, but are not limited to, silica, sodium silicates, mullite and other alumino silicates, zirconia-mullite, magnesium aluminate, magnesium silicate, zirconium silicates, feldspar and other alkali-alumino-silicates, spinels, calcium aluminate, magnesium aluminate and other alkali aluminates, zirconia, zirconia stabilized with yttria, magnesia, calcia, cerium oxide, titania, or other rare earth additives, talc, iron oxide, aluminum oxide, bohemite, boron oxide, cerium oxide, alumina-oxynitride, boron nitride, silicon nitride, graphite and combinations of these ceramic materials.

The binding material is used in powdered form and may be added to a liquid vehicle to insure a uniform, homogeneous mixture of binding material with abrasive grain during manufacture of the agglomerates.

A dispersion of organic binders is preferably added to the powdered binding material components as molding or processing aids. These binders may include dextrins, starch, animal protein glue, and other types of glue; a liquid component, such as water, solvent, viscosity or pH modifiers; and mixing aids. Use of organic binders improves agglomerate uniformity, particularly the uniformity of the binding material dispersion on the grain, and the structural quality of the pre-fired or green agglomerates, as well as that of the fired abrasive tool containing the agglomerates. Because the binders burn off during firing of the agglomerates, they do not become part of the finished agglomerate nor of the finished abrasive tool.

An inorganic adhesion promoter may be added to the mixture to improve adhesion of the binding materials to the abrasive grain as needed to improve the mix quality. The inorganic adhesion promoter may be used with or without an organic binder in preparing the agglomerates.

Although high temperature fusing binding materials are preferred in the agglomerates of the invention, the binding material also may comprise other inorganic binders, organic binders, organic bond materials, metal bond materials and combinations thereof. Binding materials used in the abrasive tool industry as bonds for organic bonded abrasives, coated abrasives, metal bonded abrasives and the like are preferred.

The binding material is present at about 0.5 to 15 volume %, more preferably 1 to 10 volume %, and most preferably 2 to 8 volume % of the agglomerate.

The preferred volume % porosity within the agglomerate is as high as technically possible within the agglomerate mechanical strength limitations needed to manufacture an abrasive tool and to grind with it. Porosity may range from 30 to 88 volume %, preferably 40 to 80 volume % and most preferably, 50–75 volume %. A portion (e.g., up to about 75 volume %) of the porosity within the agglomerates is preferably present as interconnected porosity, or porosity permeable to the flow of fluids, including liquids (e.g., grinding coolant and swarf), air and molten resin bond material during wheel curing. It is believed organic bond materials migrate into the interstitial voids of the sintered abrasive grain agglomerates while the wheel is being thermally cured, thereby strengthening the grain bond and opening the wheel structure to previously unachievable porosity volumes without an expected loss of mechanical strength.

The density of the agglomerates may be expressed in a number of ways. The bulk density of the agglomerates may be expressed as the LPD. The relative density of the agglomerates may be expressed as a percentage of initial relative density, or as a ratio of the relative density of the agglomerates to the components used to make the agglomerates, taking into account the volume of interconnected porosity in the agglomerates.

The initial average relative density, expressed as a percentage, may be calculated by dividing the LPD ($\rho$) by a theoretical density of the agglomerates ($\rho_o$), assuming zero porosity. The theoretical density may be calculated according to the volumetric rule of mixtures method from the weight percentage and specific gravity of the binding material and of the abrasive grain contained in the agglomerates.

For the sintered agglomerates of the invention, a maximum percent relative density is 50 volume %, with a maximum percent relative density of 30 volume % being more preferred.

The relative density may be measured by a fluid displacement volume technique so as to include interconnected porosity and exclude closed cell porosity. The relative density is the ratio of the volume of the sintered agglomerate measured by fluid displacement to the volume of the materials used to make the sintered agglomerate. The volume of the materials used to make the agglomerate is a measure of the apparent volume based on the quantities and packing densities of the abrasive grain and binder material used to make the agglomerates. For the sintered agglomerates of the invention, a maximum relative density of the sintered agglomerates preferably is 0.7, with a maximum relative density of 0.5 being more preferred.

Agglomerates used in the bonded abrasive tools herein may be manufactured by the methods disclosed in commonly owned U.S. Pat. No. 6,679,758, which is hereby incorporated by reference. As disclosed therein, a simple mixture of the grain and binding material (optionally with an organic binder) is fed into a rotary calcination apparatus and the binder is fired (e.g., about from 650 to about 1400° C.) to form a glass or vitrified bond holding the abrasive grain together in an agglomerate. When agglomerating abrasive grain with lower temperature curing (e.g., about from about 145 to about 500° C.) binding materials, an alternative embodiment of this rotary kiln apparatus may be used. The alternative embodiment, a rotary dryer, is equipped to supply heated air to the discharge end of the tube to heat the abrasive grain mixture, cure the binding material, bonding it to the grain, and thereby agglomerate the abrasive grain as it is collected from the apparatus. As used herein, the term "rotary calcination kiln" includes such rotary dryer devices.

In another method of making the abrasives grain agglomerates, a paste may be made of the binding materials and grain with an organic binder solution and extruded into elongated particles with the apparatus and method disclosed in U.S. Pat. No. 4,393,021, and then sintered.

In a dry granulation process, a sheet or block made of abrasive grain imbedded in dispersion or paste of the binding material may be dried and then a roll compactor may be used to break the composite of grain and binding material, followed by a sintering step.

In another method of making green or precursor agglomerates, the mixture of the binding material and the grain may be added to a molding device and the mixture molded to form precise shapes and sizes, for example, in the manner disclosed in U.S. Pat. No. 6,217,413 B1.

In another process useful herein for making agglomerates, a mixture of the abrasive grain, binding materials and an organic binder system is fed into an oven, without pre-agglomeration and heated. The mixture is heated to a temperature high enough to cause the binding material to melt, flow and adhere to the grain, then cooled to make a composite. The composite is crushed and screened to make the sintered agglomerates.

The following Examples are provided by way of illustration of the invention, and not by way of limitation.

EXAMPLE 1

Abrasive Grain/Vitrified Binder Agglomerates

Vitrified binding materials (see Table 1-1, footnotes b and c) were used to make agglomerated abrasive grain. The agglomerates were prepared according to the rotary calcination method described in U.S. Pat. No. 6,679,758 B, Example 1, using the materials described below. The agglomerates were made with 3 wt. % Binder A. The calciner temperature was set at 1250° C., the tube angle was 2.5 degrees and the rotation speed was 5 rpm. The abrasive grain was a fused alumina 38A abrasive grain, 80 grit size, obtained from Saint-Gobain Ceramics & Plastics, Inc., Worcester, Mass., USA.

The vitrified grain agglomerates were tested for loose packing density, relative density and size. Test results are listed in Table 1-1 below. Agglomerates consisted of a plurality of individual abrasive grits (e.g., 2 to 40 grits) bonded together by vitrified binding material at grit to grit contact points, together with visible void areas. The majority of the agglomerates were sufficiently resistant to compaction to retain a three dimensional character after being subjected to abrasive wheel mixing and molding operations.

TABLE 1-1

Abrasive Grain/Vitrified Binder Agglomerates

| Sample No. Mix: grain, binding material | Weight lbs (kg) of mix | Wt % Abrasive Grain | Binding material Wt % | Volume % binding material[a] | LPD g/cc −20/+45 mesh fraction | Average size microns (mesh) | Average % relative density |
|---|---|---|---|---|---|---|---|
| AV2 80 grit 38A, Binder A[b] | 84.94 (38.53) | 94.18 | 2.99 | 4.81 | 1.036 | 500μ −20/+45 | 26.67 |
| AV3 80 grit 38A Binder E[c] | 338.54 (153.56) | 88.62 | 6.36 | 9.44 | 1.055 | 500μ −20/+45 | 27.75 |

[a]The percentages are on a total solids basis, only include the vitrified binder material and abrasive grain, and exclude any porosity within the agglomerates. Temporary organic binder materials were used to adhere the vitrified bond to the abrasive grain (for AV2, 2.83 wt % liquid protein binder was used, and for AV3, a mixture of 3.77 wt % liquid protein binder was used). The temporary organic binder materials were burned out during the sintering of the agglomerates in the rotary calciner and the final wt % binding material does not include them.

TABLE 1-1-continued

Abrasive Grain/Vitrified Binder Agglomerates

| Sample No. Mix: grain, binding material | Weight lbs (kg) of mix | Wt % Abrasive Grain | Binding material Wt % | Volume % binding material[a] | LPD g/cc −20/+45 mesh fraction | Average size microns (mesh) | Average % relative density |
|---|---|---|---|---|---|---|---|

[b]Binder A (described in U.S. Pat. No. 6,679,758, Example 1) is a mixture of raw materials (e.g., clay and minerals) commonly used to make vitrified bonds for abrasive grinding wheels. Following agglomeration, the sintered glass composition of Binder A includes the following oxides (wt %): 69% glass formers ($SiO_2 + B_2O_3$); 15% $Al_2O_3$; 5–6% alkaline earth oxides RO (CaO, MgO); 9–10% Alkali $R_2O$ ($Na_2O$, $K_2O$, $Li_2O$), and has specific gravity of 2.40 g/cc and an estimated viscosity at 1180° C. of 25,590 Poise.
[c]Binder E (described in U.S. Pat. No. 6,679,758, Example 1) is a mixture of raw materials (e.g., clay and minerals) commonly used to make vitrified bonds for abrasive grinding wheels. Following agglomeration, the sintered glass composition of Binder E includes the following oxides (wt %): 64% glass formers ($SiO_2 + B_2O_3$); 18% $Al_2O_3$; 6–7% alkaline earth oxides RO (CaO, MgO); 11% Alkali $R_2O$ ($Na_2O$, $K_2O$, $Li_2O$), and has specific gravity of 2.40 g/cc and an estimated viscosity at 1180° C. of 55,300 Poise.

Abrasive Wheels

Agglomerates were used to make experimental abrasive grinding wheels (type 1) (finished size 24×8×12 inch (61.0× 20.3×8.08 cm)).

The experimental wheels were made by adding the agglomerates to a rotating paddle mixer and blending with the agglomerates a liquid phenolic resin (V-1181 resin from Honeywell International Inc., Friction Division, Troy N.Y.) (24 wt % of resin mixture). The wet agglomerates were added to a powdered phenolic resin (Durez Varcum® resin 29-717 obtained from Durez Corporation, Dallas Tex.) (76 wt % of resin mixture). The weight percent quantities of abrasive agglomerate and resin bond used to make these wheels and the composition of the finished wheels (including volume % abrasive, bond and porosity in the cured wheels) are listed in Table 1-2, below.

The materials were blended for a sufficient period of time to get a uniform blend and minimize the amount of loose bond. After blending, the agglomerates were screened through a 10 mesh screen to break up any large clumps of resin. The uniform agglomerate and bond mixture was placed into molds and pressure was applied to form green stage (uncured) wheels. These green wheels were removed from the molds, wrapped in coated paper and cured by heating to a maximum temperature of 160° C., graded, finished, and inspected according to commercial grinding wheel manufacturing techniques known in the art.

TABLE 1-2

Wheel Compositions

| Wheel Sample | Wheel Composition Volume % | | | | | |
|---|---|---|---|---|---|---|
| (Agglomerate) Grade | Cured Density g/cc | Abrasive Grain | Bond Total[c] (organic) | Porosity | Weight % Agglomerate | Weight % Bond |
| Experimental Wheels | | | | | | |
| 1-1 N grade | 1.928 | 26 | 38 (36.2) | 26 | 75.9 | 24.1 |

TABLE 1-2-continued

Wheel Compositions

| Comparative Wheels[a] | Cured Density g/cc | Grain Vol % | Bond Vol % | Porosity vol % | Weight % Abrasive | Weight % Bond |
|---|---|---|---|---|---|---|
| C-1 U grade | 2.574 | 48 | 40 | 12 | 78.7 | 21.3 |

[a]The C-1 wheels are made with a phenolic resin bond and these wheel specifications are representative of centerless grinding products that are commercially available from Saint-Gobain Abrasives, Inc., Worcester, MA. They contain a premium alumina abrasive grain, Norton SG ® sintered sol gel alpha-alumina grain, having a much higher grinding efficiency than the fused alumina grain used in the experimental wheel 1-1.
[c]The "Total" volume % of bond is the sum of the amount of vitrified binder material used to agglomerate the grain and the amount of organic resin bond used to make the grinding wheel. The "(organic)" volume % of bond is the portion of the Total volume % bond consisting of the organic resin added to the agglomerates to make the grinding wheel.

Grinding Tests

The experimental wheels were tested in a centerless grinding test in comparison with comparative standard wheels (C-1) bonded with phenolic resin and representative of a class of wheels specified by Saint-Gobain Abrasives, Inc., Worcester, Mass., as optimum products for use in commercial centerless grinding operations. Comparative wheels were selected because they had compositions, structures and physical properties equivalent to those wheels used in commercial centerless grinding operations.

Grinding machine: Cincinnati 230-12 Twin Grip Centerless
Mode: thru-feed
Coolant: Trim e210 water soluble oil at 5% concentration
Workpiece: 52100 steel, 1.2" diameter and 1" length
Grinding wheel speed: 1313 rpm
Regulating wheel speed: 130 rpm
Regulating wheel specification: 57A80RR-51
Regulating wheel feed angle: 1 degree
Depth of cut: 0.0025 inches (0.064 mm), 0.004 inches (0.102 mm), or 0.006 inches (0.152 mm) on diameter
Grinding wheel dressing: Multi-point diamond, at 12 inches per minute traverse rate, 0.0005 inches radial comp.
Regulating wheel dressing: Single point diamond, at 6 inches per minute traverse rate, 0.0005 inches radial comp.

Wheel wear rates (WWR), material removal rates (MRR) and other grinding variables were recorded as the grinding runs were made. These data are shown in Table 1-3, below.

TABLE 1-3

Grinding Test Results

| Wheel Sample (Agglomerate) Grade | Stock Removal (mm) | SGE J/mm³ | WWR' (mm3/s/mm) | G-ratio MRR/ WWR | MPA Ratio[a] |
|---|---|---|---|---|---|
| Experimental Wheels | | | | | |
| 1-1 N grade | 0.152 | 74.5 | 0.097 | 17.7 | 49.2 |
| 1-1 N grade | 0.102 | 97.5 | 0.032 | 49.6 | 137.7 |
| 1-1 N grade | 0.064 | 118.8 | 0.012 | 64.2 | 178.4 |
| Comparative Wheels | | | | | |
| C-1 U grade | 0.152 | 75.7 | 0.151 | 9.8 | 20.5 |
| C-1 U grade | 0.101 | 62.4 | 0.086 | 13.2 | 27.5 |
| C-1 U grade | 0.064 | 95.7 | 0.034 | 21.5 | 44.7 |

[a]MPA is the material removed per abrasive grain. It is obtained by dividing the G-ratio by the relative volume % abrasive grain content of the wheel being tested in order to determine how much metal is being removed per unit of abrasive grain during grinding. Since the experimental wheels contain 26 volume % abrasive grain, but the comparative wheels contain 48 volume % abrasive grain, all other factors being equivalent, one skilled in grinding technologies would anticipate higher G-ratios for the wheels made with higher volume % abrasive grain. From the MPA values, one can see the experimental wheels make much more efficient use of the abrasive grain than do the comparative wheels.

It can be seen that the experimental wheels displayed the highest MPA ratios and the lowest wheel wear rate. The comparative, commercial-type wheels made with superior grinding Norton SG® alumina grain surprisingly had lower MPA (material removed/abrasive grain) ratios and higher wheel wear rates. Conversely, the experimental wheels were superior to all comparative wheels over the 0.064 to 0.152 mm range of stock removal amounts and the experimental wheels displayed superior MPA ratios evidencing excellent efficiency.

Quite unexpectedly, the experimental wheels were observed to grind more efficiently than wheels containing higher volume percentages of grain and having a harder wheel grade. Although the experimental wheels were constructed to yield a relatively soft grade of hardness (i.e., grade N on the Norton Company grinding wheel hardness scale), they ground more aggressively, with less wheel wear, yielding a higher MPA ratio than the comparative wheels having a significantly harder grade value (i.e., grade U, 7 grades harder, on the Norton Company grinding wheel hardness scale). These significant and unexpected results are attributed to the presence of abrasive grain agglomerated with inorganic binder in the experimental wheel and the added strength and resiliency (e.g., enhanced elastic modulus) of organic bonded abrasive tools made with this agglomerated grain.

We claim:

1. A bonded abrasive tool, comprising a three-dimensional composite of
(a) a first phase comprising 20–48 vol % abrasive grains bonded with 20 to 48 vol % organic bond material and less than 10 vol % porosity, wherein 50 to 100 vol % of the abrasive grains are in the form of a plurality of grains agglomerated together by sintering the grain with an inorganic binder material, and wherein the first phase is the continuous phase of the composite; and
(b) a second phase consisting of 16 to 34 vol % porosity; wherein the bonded abrasive tool is characterized by a hardness grade between J and S on the Norton Company grade scale and a minimum burst speed of 6000 sfpm (30.48 m/s).

2. The bonded abrasive tool of claim 1, wherein the first phase of the composite comprises 24–44 vol % abrasive grains bonded with 28–38 vol % organic bond material and less than 10 vol % porosity, and the second phase consists of 18–28 vol % porosity.

3. The bonded abrasive tool of claim 1, wherein the first phase of the composite comprises 26–38 vol % abrasive grains bonded with 26–38 vol % organic bond material, and the second phase consists of 18–24 vol % porosity.

4. The bonded abrasive tool of claim 1, wherein the first phase of the composite comprises a minimum of 1 vol % inorganic binder material.

5. The bonded abrasive tool of claim 4, wherein the hardness grade of the bonded abrasive tool is at least two grade softer than that of an otherwise identical conventional tool made with abrasive grains that have not been agglomerated together by sintering with an inorganic binder material.

6. The bonded abrasive tool of claim 4, wherein the first phase of the composite comprises 2 to 12 vol % inorganic binder material.

7. The bonded abrasive tool of claim 1, wherein the inorganic bond material is selected from the group consisting of glass, vitrified bond materials, ceramic bond materials, glass-ceramic bond materials, inorganic salt materials and metallic bond materials, and combinations thereof.

8. The bonded abrasive tool of claim 1, wherein the first phase of the composite further comprises a plurality of grains agglomerated together by curing with an organic binder material.

9. The bonded abrasive tool of claim 1, wherein the first phase of the composite is a reticulated network of abrasive grain anchored within the organic bond material.

10. The bonded abrasive tool of claim 1, wherein the organic bond material is selected from the group consisting of phenolic resin materials, epoxy resin materials, polyimide resin materials, rubber materials, phenol formaldehyde resin materials, urea formaldehyde resin materials, melamine formaldehyde resin materials, acrylic resin materials and combinations thereof.

11. The bonded abrasive tool of claim 1, wherein the abrasive tool has a density of less than 2.4 g/cc.

12. The bonded abrasive tool of claim 1, wherein the abrasive tool has a density of less than 2.0 g/cc.

13. The bonded abrasive tool of claim 1, wherein the abrasive tool has an elastic modulus of less than 20 GPa.

14. The bonded abrasive tool of claim 1, wherein the first phase of the composite further comprises secondary, non-agglomerated abrasive grain.

15. A method for centerless grinding, comprising the steps of:
(a) providing a bonded abrasive wheel, comprising a three-dimensional composite of
(i) a first phase comprising 20–48 vol % abrasive grains bonded with 20 to 48 vol % organic bond material and less than 10 vol % porosity, wherein 50 to 100 vol % of the abrasive grains are in the form of a plurality of grains agglomerated together by sintering the grain with an inorganic binder material, and wherein the first phase is the continuous phase of the composite; and (ii) a second phase consisting of 16 to 34 vol % porosity; wherein the bonded abrasive tool is characterized by a hardness grade between J and S on the Norton Company grade scale and a minimum burst speed of 6000 sfpm (30.48 m/s);

(b) mounting the bonded abrasive wheel on a centerless grinding machine;

(c) rotating the wheel; and (d) bringing a grinding surface of the rotating wheel into contact with a workpiece being rotated by a regulating wheel and supported by a workrest fixture for a sufficient period of time to grind the workpiece;

whereby the wheel removes workpiece material at an effective material removal rate, the grinding surface of the wheel remains substantially free of grinding debris and, after grinding has been completed, the workpiece is substantially free of thermal damage.

16. The method for centerless grinding of claim 15, wherein the bonded abrasive wheel has a minimum burst speed of 7500 sfpm (38.10 m/s).

17. The method for centerless grinding of claim 15, wherein the bonded abrasive wheel is rotated at a speed of 5500 to 9600 sfpm (27.94 to 48.96 m/s).

18. The method for centerless grinding of claim 15, wherein the bonded abrasive wheel is a cylinder, having two circular faces, a mounting hole, and a radial perimeter and the grinding surface of the wheel is the radial perimeter of the cylinder.

* * * * *